United States Patent [19]

Brown et al.

[11] Patent Number: 4,620,421
[45] Date of Patent: Nov. 4, 1986

[54] TEMPERATURE STABILIZATION SYSTEM

[75] Inventors: Winthrop K. Brown; Frank L. Lankford, Jr., both of Bellaire, Tex.

[73] Assignee: Texaco Inc., White Plains, N.Y.

[21] Appl. No.: 498,390

[22] Filed: May 26, 1983

[51] Int. Cl.$^4$ .................. F25B 21/02; F25B 29/00
[52] U.S. Cl. .................................... 62/3; 165/26; 236/78 D
[58] Field of Search ............... 62/3; 165/26; 236/51, 236/78 D; 364/557, 505; 374/171, 183

[56] References Cited

U.S. PATENT DOCUMENTS

| | | | |
|---|---|---|---|
| 3,285,055 | 11/1966 | Reinecke | 165/30 |
| 3,438,214 | 4/1969 | Schmittle | 62/3 |
| 3,765,244 | 10/1973 | Brzezinski | 374/183 |
| 4,181,957 | 1/1980 | Pinckaers | 364/557 |
| 4,199,953 | 4/1980 | Richter, Jr. et al. | 62/3 |
| 4,200,910 | 4/1980 | Hall | 364/557 X |

Primary Examiner—William E. Wayner
Attorney, Agent, or Firm—Robert A. Kulason; Ronald G. Gillespie

[57] ABSTRACT

A system for stabilizing the temperature of a radiation detector assembly includes a heat pipe device which generally encloses the radiation detector assembly and absorbs the ambient heat of the radiation detector assembly. A temperature sensor senses the ambient temperature in the heat pipe device and provides a constant current signal representative of the sensed temperature. A heating cooling device controls the ambient temperature within the heat pipe device in accordance with a constant current control signal. Apparatus located at a substantial distance from the radiation detector assembly and connected to the temperature sensor and the heating cooling device provides the constant current control signal to the heating cooling device in accordance with the constant current temperature signal from the temperature sensor so as to control the temperature of the radiation detector assembly.

10 Claims, 3 Drawing Figures

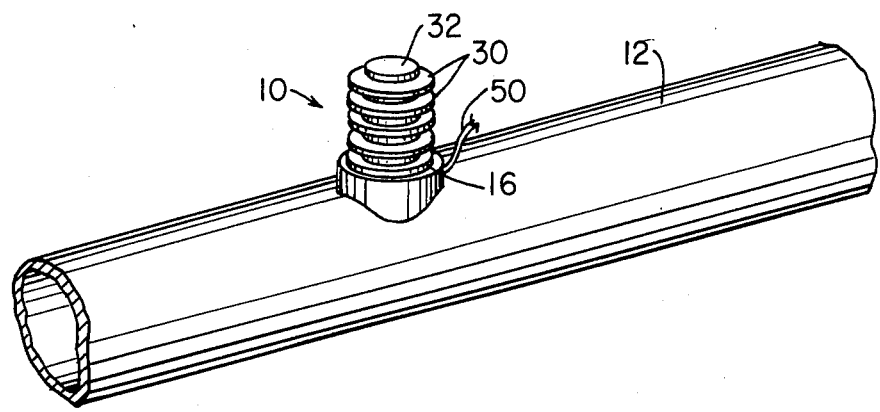
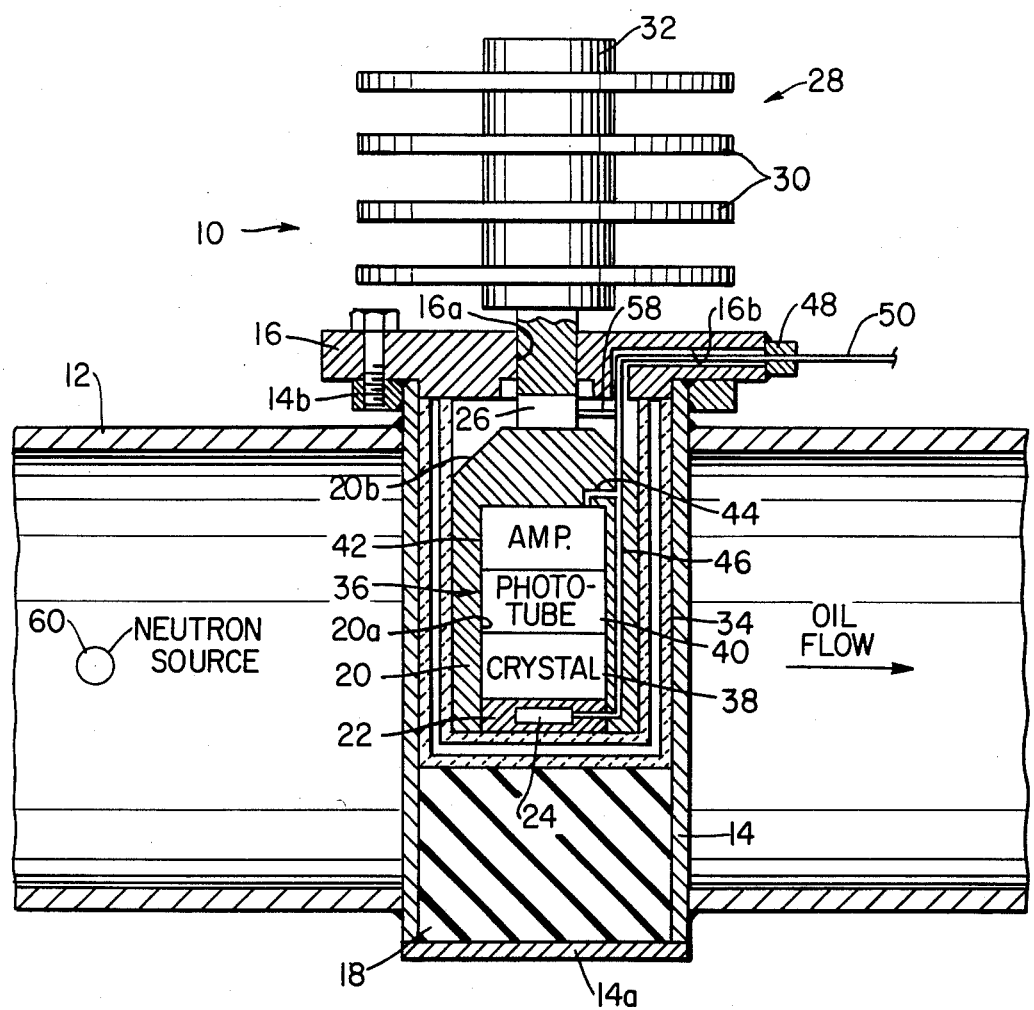

TEMPERATURE STABILIZATION SYSTEM

BACKGROUND OF THE INVENTION

Field of the Invention

The present invention relates to temperature stabilization systems in general and, more particularly, to temperature stabilization systems for radiation detector assemblies.

SUMMARY OF THE INVENTION

A system for stabilizing the temperature of a radiation detector assembly includes a heat pipe device which generally encloses the radiation detector assembly and absorbs the ambient heat of the radiation detector assembly. A temperature sensor senses the ambient temperature in the heat pipe device and provides a constant current signal representative of the sensed temperature. A heating cooling device controls the ambient temperature within the heat pipe device in accordance with a constant current control signal. Apparatus located at a substantial distance from the radiation detector assembly and connected to the temperature sensor and the heating cooling device provides the constant current control signal to the heating cooling device in accordance with the constant current temperature signal from the temperature sensor so as to control the temperature of the radiation detector assembly.

The objects and advantages of the invention will appear more fully hereinafter, from a consideration of the detailed description which follows, taken together with the accompanying drawings, wherein one embodiment is illustrated by way of example. It is to be expressly understood, however, that the drawings are for illustrative purposes only and are not to be construed as defining the limits of the invention.

DESCRIPTION OF THE DRAWINGS

FIG. 1 is a perspective view of a section of pipeline equipped with a through-bore housing containing a portion of a temperature stabilization system according to the present invention.

FIG. 2 is a horizontal cross-sectional schematic view of a segment of pipeline showing the installation of a radiation detector assembly and a portion of the temperature stabilization system.

DESCRIPTION OF THE INVENTION

Figure 3:
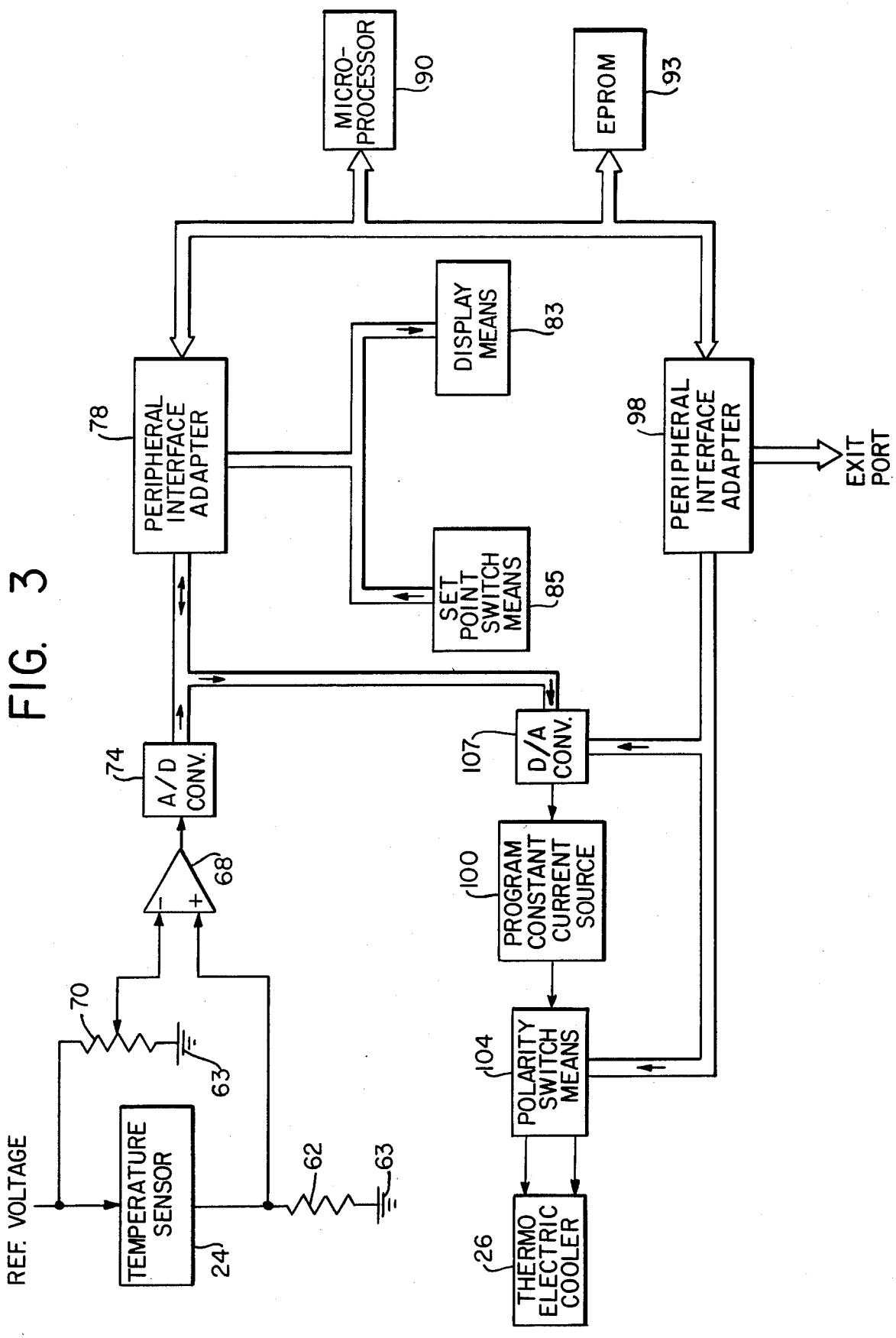
FIG. 3 is a simplified block diagram of the electronics portion of the temperature stabilization system constructed in accordance with the present invention.

The present invention is an improvement over the temperature stabilization system described and disclosed in U.S. Pat. No. 4,199,953. With reference to FIGS. 1 and 2, a temperature stabilization system 10 is installed in a pipeline 12. A cylindrical instrument housing 14 traverses the pipeline 12 to form a through-bore housing in pipeline 12. An end cap 14a closes the bottom of the housing 14. The top of the housing 14 features a flange 14b to which is bolted a collar 16. Heat insulating material 18 occupies the bottom of the housing.

The temperature stabilization system at 10 includes a metal heat pipe 20 constructed of good heat conducting material, such as copper. The heat pipe 20 is generally cylindrical, and defines a chamber 20a which is closed at the bottom end by a plug 22 of similar good thermal conducting material. A constant current temperature sensor 24, such as a highly accurate monolithic transducer is embedded in, or otherwise joined to the plug 22. One such transducer which may be used as sensor 24 is made by Analog Devices as their part number AD590LH which provides a current of 1 uA current per degree Kelvin. Constant current as used herein means that the current will not vary for extraneous reasons but will vary as it is intended. For example, if the temperature changes then the current provided by sensor 24 will change accordingly. If the temperature does not change, then the current remains the same. The plug 22 is fitted snugly into the end opening of the heat pipe 20 so as to form a good thermal conduction path therebetween. Thus, with the thermistor 24 in thermal communication with the plug 22. the temperature of the plug as well as that of the lower end of heat pipe 20 may be determined by way of the thermistor.

A heat removal device, such as a thermo-electric cooler, 26 is joined to the top of the heat pipe 20. To provide an efficient heat path to the cooler 26, the heat pipe 20 may feature a frustoconical-shape 20b resulting in an end surface generally as broad as the extent of the cooler. A heat dissipating device, shown generally at 28, is joined to the hot side of the thermo-electric cooler 26 through a central passage 16a in the collar 16. Thus, as the cooler 26 is operated to remove heat from the heat pipe 20, the exhaust heat from the cooler is communicated to the heat dissipating device 28. The device 28 may be a radiating fin assembly as shown, featuring a series of fins 30 that are joined to the thermo-electric cooler 26 by a along the core 32 to the fins 30 which provide a large surface area through which the heat may transfer into the atmosphere.

The housing 14 is lined by a dewar flask 34, and the heat pipe 20 is fitted snugly within the dewar flask. The heat pipe 20 is thus substantially surrounded by a vacuum chamber provided by the dewar flask 34. The vacuum effectively limits heat transfer from the environment to the heat pipe 20 to radiant heat which traverses the vacuum.

A radiation detector assembly, shown generally at 36, may be positioned within the heat pipe 20 before the plug 22 is put in place. A typical detector 36 may include a scintillation crystal 38 optically coupled to a photomultiplier tube 40. An amplifier 42 is provided to amplify the pulse signals from the photomultiplier tube. Appropriate electrical connections to the photomultiplier tube 40 and the amplifier 42 may be provided by way of a cable 44 which passes through the heat pipe 20 and along a passage 16b in the collar 16. Similarly, appropriate leads 46 pass along the heat pipe 20 from sensor 24 and through the passage 16a. A cable connector 48 is provided at the collar 16, and an appropriate cable 50, joined thereto, continues the electrical conductors from the sensor 24 and the radiation detector assembly 36 to external electronics.

Signal processing circuitry for analyzing the pulse signals from the radiation detector assembly at 36 are known in the art, and are not described in further detail herein.

In FIG. 2, a neutron source 60 is shown positioned within the pipeline 12, with the radiation detector assembly 36 and the temperature stabilization system 10 located downstream of the neutron source as indicated by the arrow showing the direction of oil flow. The neutron source 60, shown schematically in FIG. 2, may be of any suitable type known in the art, and is not further described in detail herein. As the oil flows past the neutron source 60, and is radiated thereby, unstable isotope particles, such as chlorine 36, are formed as discussed hereinbefore, and decay by emission of gamma rays which may then be detected by the detector assembly at 36.

While the instrument housing 14 may be a permanent structure within the pipeline 12, the temperature stabilization system at 10, along with the radiation detector assembly at 36, may be freely inserted into the housing 14, or removed therefrom. Furthermore, particular details of construction of the temperature stabilization system at 10 may be varied to accommodate different detector assemblies within the scope of the present invention. For example, the dimensions of the heat pipe 20 may be so altered to house different sized detector assemblies. Also, the design of the heat dissipating device at 28 may be chosen to most economically transfer heat to the surrounding atmosphere.

A heat pipe 20 is provided to substantially enclose the radiation detector assembly at 36. A temperature sensing device, such as a temperature sensor 24, is provided to sense the temperature at the heat pipe 20, and a heat removal device, such as the thermo-electric cooler 26, is provided for selectively removing heat from the heat pipe. The temperature of the heat pipe, as indicated by the sensor 24, is compared to a reference temperature, or corresponding reference signal value. Whenever the comparison indicates that the temperature at the heat pipe 20 is greater than that of the reference temperature, a control signal is produced which triggers a power source to operate the thermo-electric cooler to so remove heat from the heat pipe. A heat dissipating mechanism is also provided to dissipate heat from the heat removal device into the atmosphere. A vacuum chamber is provided to at least partially enclose the heat pipe to effectively reduce the heat transferred to the heat pipe from the environment to radiant heat.

A control system along with sensor 24 and thermo-electric cooler 26, shown in FIG. 3, provides a constant current control signal to thermo-electric cooler 26 causing to heat or cool accordingly as hereinafter explained. Sensor 24 provides a current of 1 uA current per degree Kelvin. The current from sensor 24 is converted to a voltage by a resistor 62 connected to ground 63. Resistor 62 as with all other higher numbered elements may be located at a substantial distance from detector 36. The voltage is applied to an amplifier 68. The voltage provided to temperature sensor 24 is also applied to a potentiometer 70 which is used to establish an offset voltage for amplifier 68 and is applied to the negative input thereof. Amplifier 68 is provided with offset voltage and gain so that its output, for example, may vary between 0 and 10 volts for a temperature range of 10° C. to 35.5° C.

An analog-to-digital converter 74 converts the output from amplifier 68 to digital signals which are provided to a peripheral interface adapter 78, hereinafter referred to as PIA. The PIA 78, as well as another PIA discussed hereinafter, may be of the type manufactured by Motorola as their part MC6821L. PIA 78 provides digital signals representative of the sensed temperature and digital signals from a switch means 85 representative of the temperature sense point to a microprocessor 90 which may be of the type manufactured by Motorola under their part number MC6802. PIA 78 also transfers signals from microprocessor 90 to a display means 83.

Microprocessor 90 contains a built-in random access memory and can also read the information in erasable programmable read only memory (EPROM) 93 which may also be of the type manufactured by Motorola as their part number 2716.

Microprocessor 90 in operation with read only memory 93 provides digital signals to another PIA 98 which in turn provides signals to a programmable constant current source 100 and to a polarity switch means 104. Digital signals from PIA 78 are provided to the digital-to-analog converter 107. The voltage level of the output of digital-to-analog converter 107 controls the magnitude of the constant current control signal that is provided by programmable constant current source 100. The polarity of the control signal, that is, whether the current will cause thermo-electric cooler 26 to heat or cool the detector 36 is controlled by PIA 98. Polarity switch means 104 provides the constant current to thermo-electric cooler 26.

Programs for utilization of temperature sensor 24 and thermo-electric cooler 26 are stored in memory 93. For example, the sensed temperature can be read periodically and the average of the detected temperature can be determined. The sensed temperature is compared to a predetermined set point temperature to produce a temperature error. If the error is greater than 1.5° C. (in either direction) the control system sets (or resets) a heat and cool flag and sets the constant current to 100% (6 amperes) until the next temperature measurement. The heat and cool flag determines polarity of the power applied to the thermo-electric cooler 26.

When the error is smaller than 1.5° C. the program selects a hexadecimal figure from 0 to 00C8 (hex) (0–200 decimal) from a memory location. This number is loaded into digital to analog converter 107. The 200 (decimal) possible values represent one-half percent changes in the current output being applied to the thermo-electric cooler 26. Depending whether more or less cooling is required the number is either incremented or decremented, respectively. The size of the measured error determines how much this number will change. If the detector temperature equals the set point temperature or has moved closer to it since the last error measurement the number is not changed, or if the number is incremented to 00C8 (hex) (200 decimal) the controller is at 100% capacity. If the number is decremented to zero the heat and cool flag is complemented to change the unit to the other mode. The number of times per hour the current value is adjusted is predetermined and it may be varied according to programming.

The present invention as hereinbefore described is a temperature stabilization system for a radiation detector and whose control portion of the system need not be in close proximity to the radiation detector. Further, the control portion may be programmed as desired for temperature control and readout as well as interfaced with any other control or monitoring systems that are independent of the temperature stabilization of the radiation detector.

What is claimed is:

1. A system for stabilizing the temperature of a radiation detector assembly comprising:
   heat pipe means, generally enclosing said radiation detector assembly whereby ambient heat is absorbed by said heat pipe means,
   sensor means responsive to the temperature in said heat pipe means for providing a constant current temperature signal representative of the sensed temperature, heat control means for selectively controlling the temperature within said heat pipe means in accordance with a constant current control signal, and signal means located at a substantial distance from said radiation detector assembly and connected to the sensor means and the heat control means for providing the constant current control signal to the heat means in accordance with the constant current temperature signal from the sensor means so as to control the temperature of the radiation detector assembly.

2. A system as described in claim 1 in which the signal means includes to a digital temperature signal, means for establishing a set point temperature and providing a corresponding set point temperature signal, source means for providing a constant current signal to the heat control means, and signal control means for controlling the constant current signal means so as to control its magnitude and polarity in accordance with a difference between the sensed temperature digital signals and the set point temperature digital signals.

3. A system as described in claim 1 in which the signal control means includes;

memory means for storing temperature related information and at least one control program, and microprocessor means for accessing the memory means and the set point temperature means and controlling the source means in accordance with sensed temperature data, the set point temperature, the control program and the temperature related information from the memory means.

4. A system as described in claim 3 further comprising display means.

5. A system as described in claim 3 in which the memory means is an erasable programmable memory.

6. A system as described in claim 4 in which the microprocessor means is preprogrammed to maintain temperature stabilization.

7. A system for stabilizing the temperature of a radiation detector assembly comprising:

heat pipe means, generally enclosing said radiation detector assembly whereby ambient heat is absorbed by said heat pipe means, sensor means responsive to the temperature in said heat pipe means for providing a constant current temperature signal representative of the sensed temperature, means for providing an offset voltage, means connected to the temperature sensing means for converting the constant current to a temperature voltage, amplifier means connected to the offset voltage means and to the current converting means for amplifying the voltage from the current converting means to provide a voltage representative of the sensed temperature in accordance with the offset voltage and the temperature voltage, analog-to-digital converter means connected to the amplifier means for converting the voltage from the amplifier means to digital signals, microprocessor means for generating control digital signals, set point switch means for generating digital signals representative of a set point entered by an operator, interface means connected the analog-to-digital converter to the set point switch means and to the microprocessor means, constant current control signal means connected to the interface means and controlled by the microprocessor means for providing a constant current control signal whose magnitude and polarity is determined by the digital signal from the microprocessing means, heat control means for selectively controlling the temperature within said heat pipe means in accordance with the constant current control signal from the constant current control signal means.

8. A system as described in claim 7 in which the constant current control signal means includes a digital-to-analog converter connected to the interface means which converts a portion of the digital signals from the microprocessor means to an analog voltage whose amplitude corresponds to a temperature change, a constant current source connected to the digital-to-analog converter which provides the constant current control signal in accordance with the analog voltage from the digital-to-analog converter, and means connected to the interface means, to the constant current source and to the heat pipe means for changing the polarity of the constant current control signal in accordance with the portion of the digital signal provided by the microprocessor means not converted to analog voltage.

9. A system as described in claim 8 further comprising memory means for storing temperature related information and control programs.

10. A system as described in claim 9 in the microprocessor means is controlled by a program stored in the memory means to control the temperature stabilization of the radiation detector assembly.

* * * * *